United States Patent
Arques et al.

(10) Patent No.: US 7,742,500 B2
(45) Date of Patent: Jun. 22, 2010

(54) METHOD FOR TRANSMITTING DATA BY A MOBILE STATION COMPRISING A STEP OF DETERMINING A MAXIMUM DATAGRAM SIZE (MDS)

(75) Inventors: François-Xavier Arques, Toulon (FR); Gilles Chene, Marseilles (FR)

(73) Assignee: Gemalto SA, Meudon (FR)

( * ) Notice: Subject to any disclaimer, the term of this patent is extended or adjusted under 35 U.S.C. 154(b) by 905 days.

(21) Appl. No.: 10/474,483

(22) PCT Filed: Mar. 22, 2002

(86) PCT No.: PCT/FR02/01012

§ 371 (c)(1),
(2), (4) Date: Feb. 27, 2004

(87) PCT Pub. No.: WO02/082748

PCT Pub. Date: Oct. 17, 2002

(65) Prior Publication Data

US 2004/0131083 A1 Jul. 8, 2004

(30) Foreign Application Priority Data

Apr. 9, 2001 (FR) .................................. 01 04828

(51) Int. Cl.
*H04J 3/16* (2006.01)
*H04J 3/24* (2006.01)
*G01R 31/08* (2006.01)
*H04W 4/00* (2009.01)

(52) U.S. Cl. .................. 370/470; 370/235; 370/253; 370/332; 370/349; 370/472

(58) Field of Classification Search .............. None
See application file for complete search history.

(56) References Cited

U.S. PATENT DOCUMENTS

| | | | |
|---|---|---|---|
| 5,425,023 A | 6/1995 | Haraguchi et al. | |
| 5,809,254 A | 9/1998 | Matsuzono | |
| 5,959,974 A * | 9/1999 | Badt et al. | 370/233 |
| 6,185,218 B1 | 2/2001 | Ratcliff et al. | |
| 6,442,151 B1 * | 8/2002 | H'mimy et al. | 370/333 |
| 6,477,143 B1 * | 11/2002 | Ginossar | 370/230 |
| 6,577,614 B1 | 6/2003 | Cook et al. | 370/338 |
| 6,700,902 B1 * | 3/2004 | Meyer | 370/468 |
| 6,870,822 B2 * | 3/2005 | Balogh | 370/332 |
| 6,909,697 B1 * | 6/2005 | Langley | 370/252 |
| 6,959,007 B1 * | 10/2005 | Vogel et al. | 370/469 |
| 2002/0080726 A1 * | 6/2002 | Klassen et al. | 370/252 |
| 2003/0086542 A1 * | 5/2003 | Urien | 379/93.01 |

* cited by examiner

*Primary Examiner*—Kwang B Yao
*Assistant Examiner*—Jutai Kao
(74) *Attorney, Agent, or Firm*—Buchanan Ingersoll & Rooney PC

(57) ABSTRACT

A mobile station that includes a smart card associated with a mobile host equipment communicates by means of a protocol that is organized in several layers. These layers include at least a data transport layer of the datagram type that is adapted to transmit integral data packets of a maximum size. The transmission method carries out the step of determining the value of the maximum size of data packets that are capable of being integrally transmitted by the transport layer of the mobile host equipment, and storing that value in the card.

5 Claims, 2 Drawing Sheets

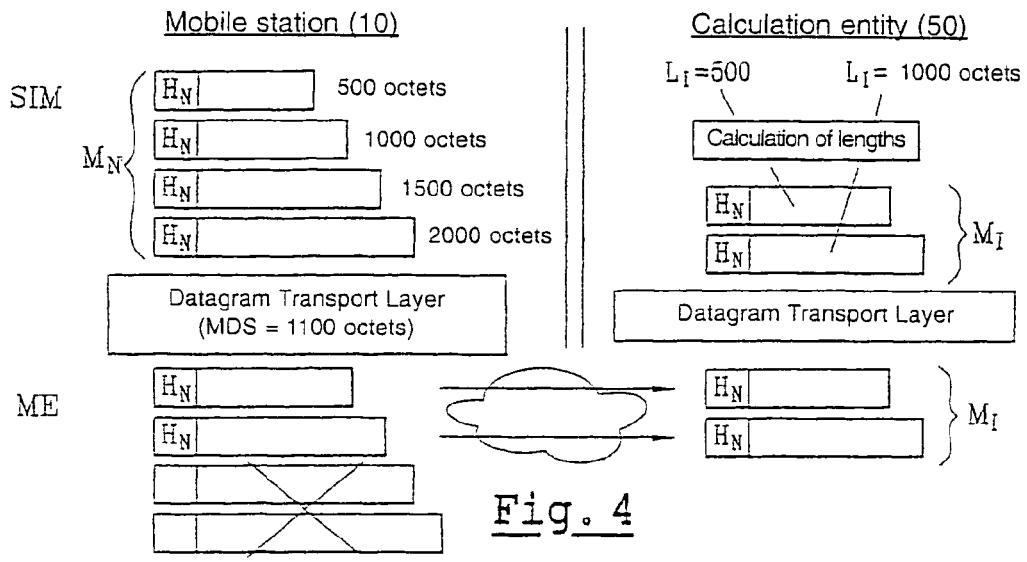
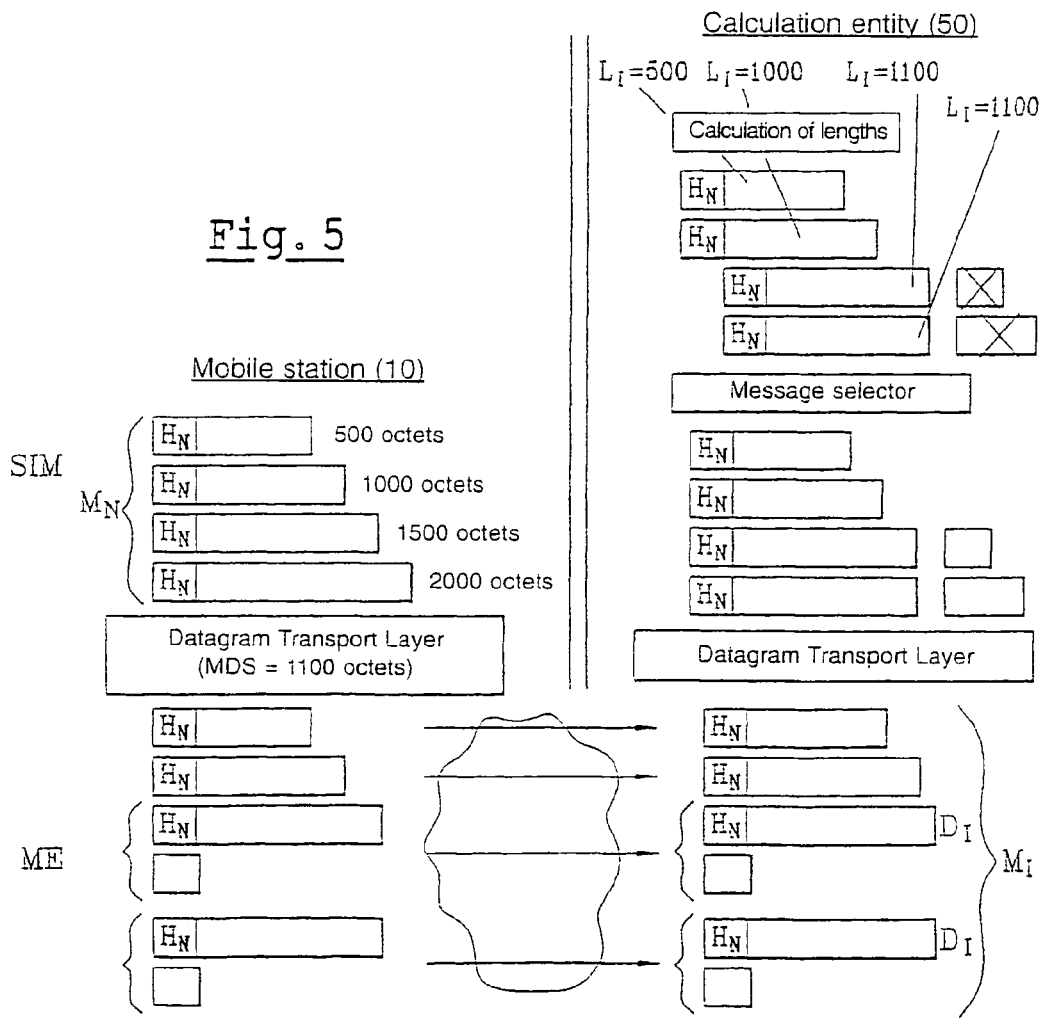
Fig. 4
Fig. 5

METHOD FOR TRANSMITTING DATA BY A MOBILE STATION COMPRISING A STEP OF DETERMINING A MAXIMUM DATAGRAM SIZE (MDS)

This disclosure is based upon French Application No. 01/04828, filed on Apr. 9, 2001 and International Application No. PCT/FR02/01012, filed Mar. 22, 2002, the contents of which are incorporated herein by reference.

BACKGROUND OF THE INVENTION

The present invention relates to a method for transmitting data in non-connected mode by means of a mobile station comprising a step of determining the maximum data packet transmission size, known by the term MDS, standing for maximum data size in English (or MMDS, standing for Mobile MDS).

The invention relates to the field of communications made from a mobile station in the context of the GSM standard. Such a mobile station is composed of an item of mobile equipment and a smart card known as a SIM (standing for Subscriber Identity Module) card. The mobile equipment may be a telephone, a personal digital assistant (PDA, standing for Personal Digital Assistant in English) or the like.

The communications in question in the context of the present invention can be communications between two mobile stations or between a mobile station and a distant server able to communicate with such a mobile station, such as for example a communication gateway, more commonly known by the term OTA (Over The Air in English) server.

Exact knowledge of the MDS may prove to be of great importance in the context of a protocol for communication from a mobile station since the transport layers used in this type of protocol are generally not reliable. These transport layers may in fact reject excessively long messages without sending an error message or segment messages into several data packets without guaranteeing the correct reassembly thereof. In the context of such a communication from a mobile station, it is therefore important to transmit only messages with a length less than or equal to the MDS in order to avoid any risk of segmentation or rejection.

Firstly, it is necessary to give a certain number of definitions and to specify the functioning of certain communication protocols from a mobile station.

The communication protocols in particular used in a wireless communication context (non-connected mode) follow on from WAP protocols (standing for Wireless Application Protocol) which govern data transmissions between mobile stations and a distant gateway (generally referred to as a WAP gateway).

FIG. 1 describes schematically the communication within a mobile station 10 composed of an item of mobile equipment ME, a telephone in the example, and a smart card SIM. The mobile station 10 can communicate with another mobile station 10' or with a distant server 100. The SIM card makes it possible to procure a subscriber identification and a key in order to allow on the one hand the authentication of the subscriber on the GSM network and on the other hand the decrypting or encrypting of the data received or sent. The SIM card also enables the subscriber to access data peculiar to the GSM network and information on the services accessible.

In the example in question, the communication between the SIM card and the mobile equipment ME is governed according to the BIP protocol (Bearer Independent Protocol) which is an option of the ETSI standard "GSM 11.14" describing the SIM Tool Kit (SKT) and which defines a set of commands and situations. The BIP protocol enables the SIM card to use the communication means of the mobile equipment ME whatever the communication technology used.

Communication protocols are generally organised in several superimposed layers. A conventional configuration consists of a network layer which rests on a physical and connection layer and which supports a transport layer, other layers being able to be added, such as security, transaction, session, application or other layers, according to the protocols in question.

The network layer most commonly used is configured according to the IP protocol (Internet Protocol). This IP network layer manages the interface between the physical transmission architecture and the upper layers, and essentially provides a function of routing data packets (also known as datagrams) as far as the destination, this function also being known by the term router. The IP protocol is not reliable in the event of loss, damage or duplication of data packets: namely the delivery of the datagrams is not guaranteed. It is generally for the upper layers to manage this type of situation.

The transport layer allows complete transfer of the data. There are essentially two protocols for configuring the transport layer. The TCP protocol (Transmission Control Protocol), as a connected mode protocol, guarantees the integrity and reliability of the data transmissions. The UDP (User Datagram Protocol) or WDP (WAP Datagram Protocol) on the other hand are non-connected mode protocols and are not considered to be reliable since they do not guarantee control of the data transfer. Because of their simplicity, they do however have the advantage of allowing a rapid transmission. These UDP or WDP transport protocols act as simple multiplexers/demultiplexers of data packets. These two transport protocols are very close together in their characteristics, or even identical in the case of certain types of connection (GPRS, CSD).

The MDS is a restriction in the transport layer (the UDP layer for example) on the maximum number of data octets which can be accepted in the transmission of a single data packet (a datagram). If a message includes more octets than the size of the MDS, the transport layer destroys it without transmitting it to the upper layers or segments it into a plurality of data packets which the receiver is not able to reconstitute.

Rejection of the messages must obviously be avoided. Likewise, segmentation of the messages must also be avoided as far as possible, in particular in the case where the UDP protocol is used for the transport layer. This is because segmentation often gives rise to data losses without the sending layers being advised of this.

It is therefore preferable for the SIM card to transmit only sufficiently short messages to avoid their segmentation (or rejection) by the transport layer of the host mobile equipment ME. Knowledge of the MDS then becomes important in order to use the capacities of the transport layer to the maximum possible extent without risking alienating the data transmitted. If the information to be transmitted is greater than that able to be contained in a single message, it is necessary for the SIM card to form a data block composed of several messages M.

FIG. 2 illustrates the structure of a message M. Each message M comprises a header H and information P (or payload in English). The header H is necessary for indicating the length of the message and its composition (for example a request to determine the MDS). Other information can naturally be entered in the header H according to the functionalities offered by the message protocol in question (for example its position with other messages in a block, the need for an acknowledgement, or the like). The length of the header H is minimised in order to allow a maximum amount of information transfer P. Thus an optional header can be provided in the case of additional parameters to be transmitted.

FIG. 3 illustrates the principle of segmentation of a message M by the transport layer UDP. The message M will be divided into a plurality of data packets D (datagrams) to the size of the MDS. Each packet D then comprises a header which does not make it possible, once arrived at its destination, to assemble it with the other packets in order to reconstitute the message M. This reconstitution is in fact not guaranteed by the UDP protocol of the transport layer.

Knowledge of the MDS is therefore important in the context of communications with mobile stations using the UDP protocol for configuring the transport layer of the mobile equipment.

SUMMARY OF THE INVENTION

The objective of the invention is to propose a method for transmitting data in non-connected mode including a step of determining the size of the MDS in order to eliminate any risk of alienation or rejection of the data transmitted.

The invention relates more specifically to a method for transmitting data according to a communication protocol from a mobile station composed of a smart card (SIM) associated with host mobile equipment, the said protocol being organised in several layers, including at least one data transport layer of the datagram type able to transmit in their entirety data packets of a maximum size (Maximum Datagram Size, MDS), characterised in that the said transmission protocol comprises a step consisting, for the card (SIM), in determining the value of the said maximum size of the data packets (MDS) able to be transmitted in their entirety by the transport layer of its host mobile equipment.

According to a first embodiment, the value of the maximum size of the data packets (MDS) is supplied to the card (SIM) directly by its host mobile equipment.

According to a second embodiment, the value of the maximum size of the data packets (MDS) is determined by the card (SIM) from the transmission of at least one message exchanged between the card of the mobile station and a calculation entity, the said messages being of distinct lengths when their number is greater than or equal to two.

According to one characteristic, the determination of the value of the maximum size of the data packets (MDS) by a calculation entity is determined by means of the following steps:

sending of N messages by the SIM card each comprising a specific header indicating at least one request for determining the maximum size of the data packets (MDS);

filtration, by the transport layer of the mobile equipment, of the messages of length less than or equal to the maximum size of the data packets (MDS);

reception of the said filtered messages which have kept the original specific header and calculation of their respective length by the calculation entity;

sending of the said lengths calculated to the card of the mobile station;

determination of the value of the said maximum size of the data packets (MDS) by the card (SIM) by comparison of the said calculated lengths.

According to the embodiment, the calculation entity is included in the smart card or in a distant server able to communicate with the mobile station.

According to one embodiment, the filtering of the transport layer consists in rejecting the messages with a length exceeding the maximum size of the data packets (MDS).

According to another embodiment, the filtering of the transport layer consists in segmenting the messages with a length exceeding the maximum size of the data packets (MDS) into a plurality of a data packets only one of which keeps the specific header of the original message.

According to one characteristic, the protocol of the transport layer is the UDP protocol (User Datagram Protocol).

The present invention also relates to a smart card (SIM) able to cooperate with host mobile equipment for communication according to a protocol organised in several layers, including at least one data transport layer of the datagram type able to transmit in their entirety data packets of a maximum size (Maximum Datagram Size, MDS), characterised in that the said card (SIM) comprises means able to extract the value of the said maximum size of the data packets (MDS) able to be transmitted in their entirety by the transport layer of its host mobile equipment.

BRIEF DESCRIPTION OF THE FIGURES

The particularities and advantages of the invention will emerge clearly from a reading of the following description, given by way of illustrative and non-limiting example and with regard to the accompanying drawings, in which:

FIG. 4 is a diagram of a first embodiment of the method according to the invention;

FIG. 5 is a diagram of a second embodiment of the method according to the invention.

DETAILED DESCRIPTION OF THE INVENTION

Figure 1:
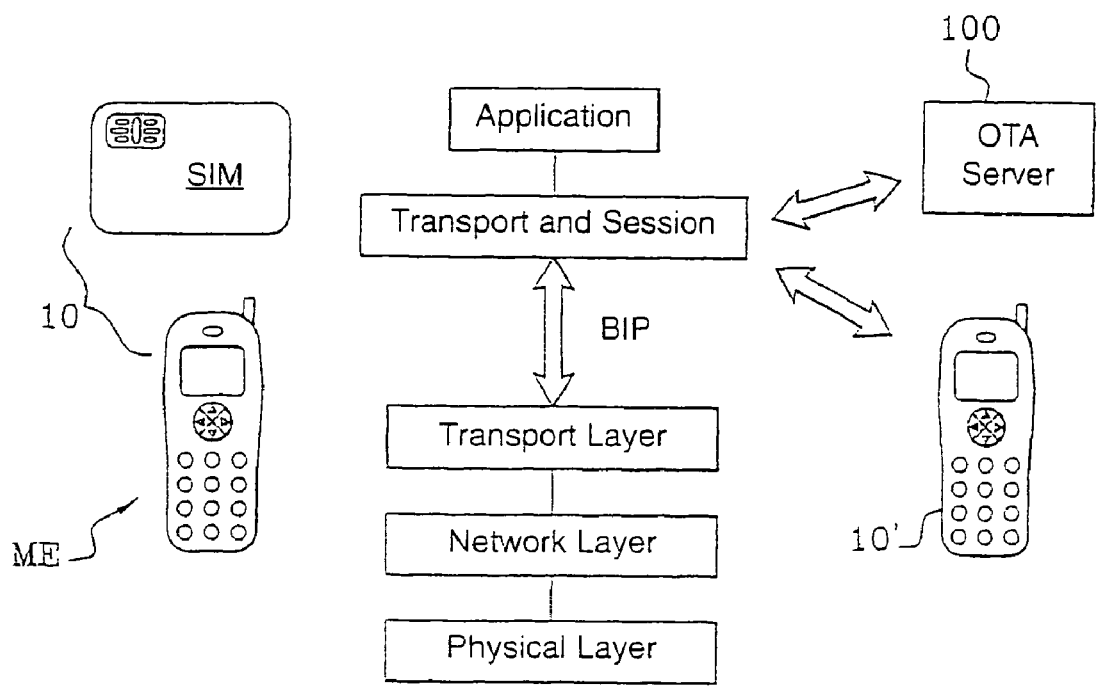
FIG. 1, already described, illustrates the interface between a SIM card and a mobile station.
Figure 2:
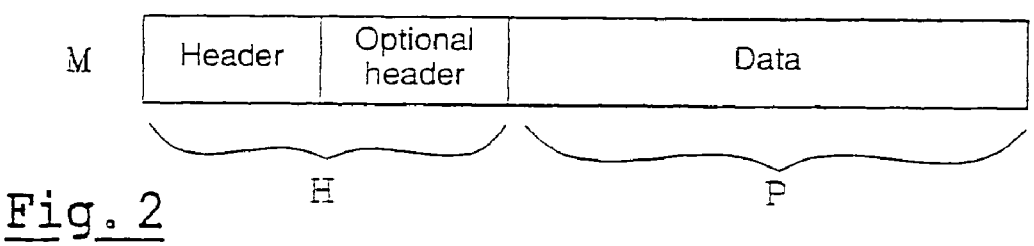
FIG. 2, already described, is a diagram of an example of the structure of a message to be transmitted.
Figure 3:
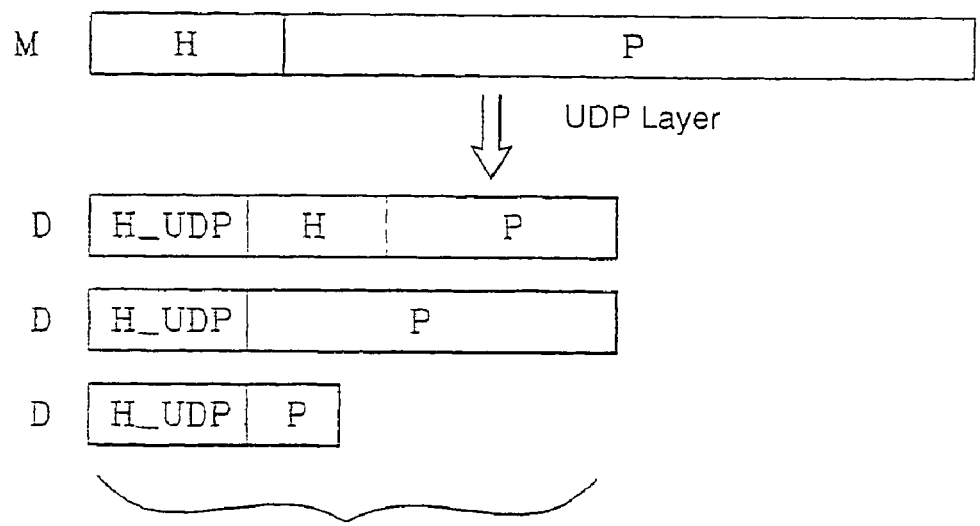
FIG. 3, already described, illustrates the principle of the segmentation of the message by the transport layer.

The objective of the present invention is to determine the value of the maximum size of the data packets able to be transmitted by the transport layer of an item of mobile equipment. Hereinafter, MDS will refer to this value to be determined. The SIM card must procure this value of the MDS for itself so as to allow reliable telecommunication between two mobile stations or between a mobile station and a distant server.

This information on the value of the MDS, which is peculiar to each item of host mobile equipment, can be supplied or determined at any time of use of the mobile station. The SIM card thus comprises means able to determine this value of the MDS and can then store the memory thereof, in particular as long as it does not detect any change in its host equipment.

According to a first embodiment, the value of the MDS is supplied to the SIM card directly by its host mobile equipment, for example when the mobile station is powered up, via a command compatible with the standard of the SKT, for example the command TERMINAL PROFILE.

According to a second embodiment, the value of the MDS is determined by calculation. FIGS. 4 and 5 illustrate the data exchanges between a mobile station 10 and a calculation entity 50 in the context of a determination of the value of the MDS. According to the application, the calculation entity 50 may be a distant server able to communicate with a mobile station (such as an OTA server already cited) or the mobile station itself or another mobile station.

This is because, to enable calculation of the MDS, it is necessary for messages to pass through the transport layer, the destination of the said messages being of little importance. The calculation entity 50 may therefore be situated in the SIM card itself in the form of an application for example, the SIM card sending messages looping back onto the address of its host mobile equipment (address of the type 127.xxx in the context of the IP protocol).

The transport layer cannot transmit any message whose length is greater than its MDS. When this case presents itself, the transport layer rejects the excessively long messages (FIG. 4) or segments them (FIG. 5). In the case of segmentation, at least one segmented data packet will be to the size of the MDS.

According to the invention, the determination of the value of the MDS is obtained by the following steps:

The mobile station 10 will send a plurality of N messages $M_N$ of different lengths, predefined or not, to the calculation entity 50.

According to the application, N may be equal to 1, that is to say a single message M is transmitted between the SIM card of the mobile station 10 and the calculation entity 50. In this case, the message M is chosen so as to be very long in order for it to be segmented with certainty by the transport layer of the mobile equipment ME.

Preferentially, a plurality of messages $M_N$ are exchanged, with N being able to be fixed between 2 and 6, or even more if necessary, according to the performance and/or capacities of the SIM card.

The header $H_N$ of each message $M_N$ must comprise information which is to permit and facilitate the calculation of the MDS. In particular, the header $H_N$ must contain the information according to which the message is a request for calculation of the MDS and possibly another field C whose octets cannot all be equal to 0xFF (that is to say all the bits at "1").

The useful information (payload) of these messages $M_N$ is on the other hand fixed with all the bits at "1", that is to say all the octets at 0xFF.

As illustrated in FIGS. 4 and 5, the transport layer filters the messages $M_I$ whose length is less than or equal to its MDS in order to transmit them in their entirety, and rejects or segments the others.

The calculation entity 50 receives messages $M_I$ which pass through the transport layer of the sending mobile equipment ME and transmits those which have kept their original header $H_N$ comprising the request to determine the MDS.

In the case of the rejection of the excessively long messages (FIG. 4), all the messages $M_I$ transmitted have kept their original header $H_N$ whilst, in the case of segmentation of the excessively long messages (FIG. 5), only a packet $D_I$ of each segmented message has kept the header $H_N$ of the original message and this packet $D_I$ has the required MDS length. In particular, if a received message comprises a field C with an octet at 0xFF, it must be rejected since it constitutes the "surplus" of a segmented original message $M_N$.

For each received message $M_I$, the calculation unit 50 will then calculate a corresponding MDS as being the length $L_I$ of the said received message $M_I$. The calculation entity 50 will then send these calculated lengths $L_I$ corresponding to the received messages $M_I$ to the SIM card, which will compare these lengths $L_I$ and keep the greatest value. The SIM card of the mobile station can then adapt the length of its subsequent messages to the length of the MDS for reliable communication.

In the case of a communication between a mobile station and a distant server, the said server can detect an abnormality in the MDS if it receives a message whose length is not that indicated in the header of the said message. It can then alert the SIM card of the mobile station so that it initiates a "new" determination of the MDS.

The invention claimed is:

1. A method for transmitting data according to a communication protocol from a mobile station, said mobile station comprising a smart card and a host mobile equipment cooperating with said smart card, said communication protocol being organized in several layers, said communication protocol including at least one data transport layer of a datagram type having a maximum size for data packets that can be transmitted in their entirety, said method comprising the steps of:

transmitting by said smart card to a calculation entity at least one message, said calculation entity determining a value of said maximum size of the data packets that can be transmitted in their entirety by said data transport layer of said host mobile equipment based on the size of the message received; and storing by said smart card said value of said maximum size of the data packets determined by the calculation entity;

wherein determining said value of the maximum size of the data packets includes:

sending one or more messages by said smart card, each message comprising a specific header indicating at least one request for determining the maximum size of the data packets;

filtering the messages having a length less than or equal to the maximum size of the data packets within said data transport layer;

receiving the filtered messages which have kept the original specific header and calculation of their respective length by said calculation entity;

sending said calculated lengths to said smart card of said mobile station; and determining said value of the maximum size of the data packets by said smart card by comparison of said calculated lengths.

2. A transmission method according to claim 1, wherein the filtering within said data transport layer of said host mobile equipment comprises rejecting messages with a length exceeding said maximum size of the data packets.

3. A transmission method according to claim 1, wherein the filtering within said data transport layer of said host mobile equipment comprises segmenting each message with a length exceeding said maximum size of the data packets into a plurality of data packets, only one of which keeps the specific header of the original message.

4. A method for transmitting data according to a communication protocol from a mobile station, said mobile station comprising a smart card and a host mobile equipment cooperating with said smart card, said communication protocol being organized in several layers, said communication protocol including at least one data transport layer of a datagram type having a maximum size for data packets that can be transmitted in their entirety, said method comprising the steps of:

transmitting by said smart card to a calculation entity at least one message, said calculation entity determining a value of said maximum size of the data packets that can be transmitted in their entirety by said data transport layer of said host mobile equipment based on the size of the message received; and storing by said smart card said value of said maximum size of the data packets determined by the calculation entity;

wherein determining said value of the maximum size of the data packets includes:

sending one or more messages by said smart card, each message comprising a specific header indicating at least one request for determining the maximum size of the data packets;

filtering the messages having a length less than or equal to the maximum size of the data packets within said data transport layer, said filtering comprising rejecting messages with a length exceeding said maximum size of the data packets;

receiving the filtered messages which have kept the original specific header and calculation of their respective length by said calculation entity;

sending said calculated lengths to said smart card of said mobile station; and determining said value of the maximum size of the data packets by said smart card by comparison of said calculated lengths.

5. A method for transmitting data according to a communication protocol from a mobile station, said mobile station comprising a smart card and a host mobile equipment cooperating with said smart card, said communication protocol being organized in several layers, said communication protocol including at least one data transport layer of a datagram type having a maximum size for data packets that can be transmitted in their entirety, said method comprising the steps of:

transmitting by said smart card to a calculation entity at least one message, said calculation entity determining a value of said maximum size of the data packets that can be transmitted in their entirety by said data transport layer of said host mobile equipment based on the size of the message received; and storing by said smart card said value of said maximum size of the data packets determined by the calculation entity;

wherein determining said value of the maximum size of the data packets includes:

sending one or more messages by said smart card, each message comprising a specific header indicating at least one request for determining the maximum size of the data packets;

filtering the messages having a length less than or equal to the maximum size of the data packets within said data transport layer, said filtering comprising segmenting each message with a length exceeding said maximum size of the data packets into a plurality of data packets, only one of which keeps the specific header of the original message;

receiving the filtered messages which have kept the original specific header and calculation of their respective length by said calculation entity;

sending said calculated lengths to said smart card of said mobile station; and determining said value of the maximum size of the data packets by said smart card by comparison of said calculated lengths.

* * * * *